United States Patent [19]

Van Broekhoven et al.

[11] Patent Number: 4,808,699

[45] Date of Patent: Feb. 28, 1989

[54] PROCESS FOR PREPARING POLYMERS OF CARBON MONOXIDE AND ETHYLENE UNDER SPECIFIED PRESSURES

[75] Inventors: Johannes A. M. Van Broekhoven; Michael J. Doyle, both of Amsterdam, Netherlands

[73] Assignee: Shell Oil Company, Houston, Tex.

[21] Appl. No.: 29,838

[22] Filed: Mar. 24, 1987

[30] Foreign Application Priority Data

Mar. 24, 1986 [NL] Netherlands ............... 8600744

[51] Int. Cl.$^4$ ............................................. C08G 67/02
[52] U.S. Cl. ................................................... 528/392
[58] Field of Search ......................................... 528/392

[56] References Cited

U.S. PATENT DOCUMENTS

| | | | |
|---|---|---|---|
| 2,495,286 | 1/1950 | Brubaker | 260/63 |
| 3,448,140 | 6/1969 | Gamlen et al. | 260/471 |
| 3,689,460 | 9/1972 | Nozaki | 260/63 |
| 3,694,412 | 9/1972 | Nozaki | 260/63 |
| 3,780,140 | 12/1973 | Hammer | 525/185 |
| 3,835,123 | 9/1974 | Nozaki | 260/94.9 |
| 3,914,391 | 10/1975 | Nozaki | 423/364 |
| 3,984,388 | 10/1976 | Shryne et al. | 260/63 |
| 4,070,532 | 1/1978 | Hammer | 536/11.2 |
| 4,076,911 | 2/1978 | Fenton | 526/11.1 |
| 4,424,317 | 1/1984 | Serres | 525/539 |
| 4,474,978 | 10/1984 | Drent et al. | 560/24 |
| 4,599,476 | 7/1986 | Drent | 585/511 |
| 4,634,793 | 1/1987 | Drent | 560/243 |

FOREIGN PATENT DOCUMENTS

| | | |
|---|---|---|
| 121965 | 8/1984 | European Pat. Off. |
| 0213671 | 3/1987 | European Pat. Off. |
| 4048406 | 12/1974 | Japan |
| 1081304 | 8/1967 | United Kingdom |
| 2058074 | 4/1981 | United Kingdom |
| 181014 | 5/1986 | United Kingdom |

OTHER PUBLICATIONS

Kirk-Othmer Encyclopedia of Chemical Technology, Second Edition, vol. 12, p. 132, 1967.
Encyclopedia of Polymer Science and Technology, 1968, vol. 9, 397–402.
J. Am. Chem. Soc., 1982, 104, 3520-2.
Organometallics 1984, 3, 866–870.
Proc. Ind. Assoc. Cult. Sci., 1985, 68B, 1–5.
Chemtech 1986, 1, 48–51.
Adv. Polym. Sci., 1986, 73–4, 125–144.
J. Organomet. Chem., 1985, 279, C5–C10.
Tetrahedron Lett., 1971, 26, 2409–12.

*Primary Examiner*—Harold D. Anderson

[57] ABSTRACT

The invention is a process for preparing a linear alternating polymer which process comprises contacting ethylene and carbon monoxide in the presence of a catalyst, at a total pressure within the range of 100 to about 250 bar and an ethylene/carbon monoxide partial pressure ratio from about 0.75 to about 3, wherein the catalyst comprise (1) a Group VIII metal compound of palladium, cobalt or nickel, (2) an anion of a non-hydrohalogenic acid with a pKa less than 6 and (3) a bidentate phosphorus, arsenic or antimony ligand.

26 Claims, No Drawings

PROCESS FOR PREPARING POLYMERS OF CARBON MONOXIDE AND ETHYLENE UNDER SPECIFIED PRESSURES

FIELD OF THE INVENTION

The invention relates to a process for the preparation of polymers of carbon monoxide and ethylene.

BACKGROUND OF THE INVENTION

Polymers of carbon monoxide and olefins, such as ethylene, have been known and available in limited quantities for many years. For example, polyketones are disclosed in Kirk-Othmer Encyclopedia of Chemical Technology, Second Edition, Vol. 12, p. 132, 1967, and in Encyclopedia of Polymer Science and Technology, 1968, Vol. 9, 397–402. It is known that polyketones may be prepared by contacting CO and ethylene monomers in the presence of a catalyst. High molecular weight polymers of ethylene which contain small quantities of carbon monoxide can be prepared with the aid of Ziegler catalysts. Low molecular weight polymers of carbon monoxide with ethylene and possibly other olefinically unsaturated hydrocarbons in which all monomer units occur distributed at random within the polymer can be prepared with the aid of radical catalysts such as peroxides. A special class of the polymers of carbon monoxide with ethylene is formed by the high molecular weight linear polymers in which the monomer units occur in alternating order and which polymers consist of units with the formula $-CO-(C_2H_4)-$. Such polymers can be prepared with the aid of, among others, phosphorus-, arsenic-, antimony-, or cyanogen-containing compounds of palladium, cobalt or nickel as catalysts.

High molecular weight linear alternating polymers of carbon monoxide and ethylene consisting of units of the formula $-CO-(C_2H_4)-$, can also be prepared by using catalyst compositions comprising:

(a) a compound of a Group VIII metal selected from the group consisting of palladium, cobalt and nickel.
(b) an anion or a non-hydrohalogenic acid having a pKa less than 2, and
(c) a bidentate ligand of the general formula

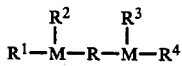

wherein M represents phosphorus, arsenic or antimony, R is a bivalent organic bridging group containing at least two carbon atoms in the bridge and $R^1$, $R^2$, $R^3$ and $R^4$ represent hydrocarbon groups.

In the above-mentioned polymer preparation both the reaction rates and the molecular weights of the polymers obtained play a major role. On the one hand it is desirable to aim at the highest possible reaction rate in the polymer preparation, on the other hand,—with a view to their potential applicability—these polymers are more valuable with higher molecular weight. Both the reaction rate and the molecular weight can be affected by the temperature and overall pressures applied during the polymerization process. Higher reaction rates and lower molecular weights will be obtained accordingly as higher reaction temperatures are chosen. The effect which a rise in reaction temperature and overall pressure has on reaction rates is greatest at reaction temperatures below 85° C. and overall pressures below 75 bar. Above these values increased reaction temperatures and overall pressures will still lead to higher reaction rates but the increase will become increasingly smaller.

In view of the above, polymers of carbon monoxide and ethylene used to be prepared mainly at a reaction temperature in the range of from 60° to 70° C. and at an overall pressure in the range of from 50 to 60 bar. A correct choice of reaction temperatures and overall pressures within the said ranges allowed polymers of sufficiently high molecular weights for the relevant application to be produced at acceptable reaction rates. Attempts to achieve an increase in reaction rate by varying the ratio between the ethylene partial pressure and the carbon monoxide partial pressure remained unsuccessful. At overall pressures below 75 bar variations in the ratios between ethylene partial pressure and carbon monoxide partial pressure ranging from 0.3 to 3 did not lead to any significant change in the reaction rate. Variations of the partial pressure ratios within the same range did not have any significant influence on the molecular weights of the polymers obtained either.

SUMMARY OF THE INVENTION

As expected from the results of low pressure polymerization, variation of the ethylene/carbon monoxide partial pressure ratio at a given high overall pressure proved to produce no significant change in the reaction rate. Surprisingly and in sharp contrast with the expectations based on earlier results of low pressure polymerization it has now been found that variation of the ethylene/carbon monoxide partial pressure ratio at a given high overall pressure has a substantial effect on the molecular weights of the polymers obtained. Polymers of considerably higher molecular weight are obtained when the polymerization is carried out at an ethylene/carbon monoxide partial pressure ratio between 0.75 and 3 as opposed to polymers prepared at the same temperature and overall pressure but at an ethylene/carbon monoxide partial pressure ratio between 0.3 and 0.75. The present invention is important not only for the preparation of polymers with higher molecular weights but also for polymerization at increased reaction rates. It is now possible by increasing the ethylene/carbon monoxide partial pressure ratio and simultaneously raising the reaction temperature to realize considerably higher reaction rates while the molecular weights of the polymers remain unchanged.

The patent application therefore relates to a process for the preparation of polymers of carbon monoxide and ethylene which process comprises contacting carbon monoxide and ethylene at a total pressure within the range of 100 to about 250 bar and an ethylene/carbon monoxide partial pressure ratio in the range of from about 0.75 to about 3 in the presence of catalyst comprising (1) a compound of Group VIII metal selected from the group consisting of palladium, cobalt and nickel, (2) an anion of a non-hydrohalogenic acid with a pKa less than 6, and (3) a bidentate ligand of the general formula

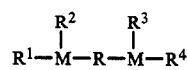

wherein M is selected from the group consisting of phosphorus, arsenic or antimony, R is a bivalent organic bridging group containing at least two carbon atoms in the bridge, $R^1$, $R^2$, $R^3$ and $R^4$ are substituted or non-substituted hydrocarbon groups, and under conditions suitable to prepare a linear alternating polymer.

The patent application further relates to the polymers of carbon monoxide and ethylene thus prepared and to shaped objects which consist at least partly of these polymers.

DETAILED DESCRIPTION OF THE INVENTION

The process according to the invention is carried out at an overall pressure in the range of 100 to about 250 bar, preferably within the range of 100 to about 200 bar, and most preferably between about 125 and 175 bar. As regards the ethylene/carbon monoxide partial pressure ratio used, preference is given to a ratio lying between 0.80 and 2.5 and in particular between 0.85 and 2.

The preferred Group VIII metal compound present in the catalyst composition is a palladium compound. Very suitable are palladium salts of carboxylic acids and in particular palladium acetate. Examples of suitable acids with a pKa less than 6 (determined in aqueous solution at 18° C.) are sulfuric acid, perchloric acid, sulfonic acids, such as methanesulfonic acid, trifluoromethanesulfonic acid and para-toluenesulfonic acid and carboxylic acids, such as trichloroacetic acid, difluoroacetic acid, and trifluoroacetic acid. Preferred are all acids with a pKa less than 4, acids with a pKa less than 2 are even more preferred. The most preference is given to paratoluenesulfonic acid and trifluoroacetic acid.

In the catalyst compositions component 2 is preferably present in a quantity of from 0.5 to 200 and in particular of from 1.0 to 100, equivalents per gram atom of palladium. Component 2 may be introduced into the catalyst compositions either in the form of an acid or as a salt. Eligible salts are salts of non-noble transition metals and salts of main group metals. Examples of transition metals whose salts are very suitable for use as component 2 are the Group 4B metal zirconium, the Group 5B metal vanadium, the Group 6B metal chromium, the Group 8 metals iron and nickel, and Group 1B metal copper, the lanthanide cerium and the actinides thorium and uranium. If the catalyst compositions component 2 is used in the form of an acid or in the form of a salf of a non-noble transition metal, it is preferred also to include a quinone as component 4 in the catalyst compositions in order to enhance the activity of the latter. 1,4-Benzoquinones have proved very useful for this purpose.

Examples of main group metals the salts of which can very suitably be used as component 2 are the Group 3A metals aluminium and gallium, the Group 4A metals tin and lead and the Group 5A metal antimony. It is preferred when a salt of a metal belonging to the main groups 3A–5A is used as component 2, that in addition an ether is included in the catalyst compositions as component 4 in order to enhance their activity. Crown ethers have proved to be very suitable ethers. Salts of Group 1A metals such as lithium, potassium and sodium and salts of Group 2A metals such as magnesium are also suitable for the purpose, provided that the catalyst compositions also contain an ether as component 4.

Optionally the two components 1 and 2 can be combined and used in the form of a single compound. An example of such a compound is the complex $Pd(CH_3CN)_2(O_3S-C_6H_4-CH_3)_2$ which can be prepared by reaching a palladium chloride with the silver salt of para-toluene-sulphonic acid in acetonitrile as the solvent. In the bidentate ligand M is preferably phosphorus. The preferred quantity of bidentate ligand present in the catalyst composition is from 0.1–5 and more preferred from 0.5–1.5 mol per mol of Group VIII metal compound. The groups $R^1$, $R^2$, $R^3$ and $R^4$ present in the bidentate ligand each preferably contain 6 to 14 carbon atoms. Especially preferred are bidentate ligands in which each of the groups $R^1$, $R^2$, $R^3$ and $R^4$ contains an aryl group which is directly linked to the M atom. Even more preferred are phenyl groups and substituted phenyl groups. $R^1$, $R^2$, $R^3$ and $R^4$ may also be substituted with polar groups. The bivalent organic bridging group R preferably contains three carbon atoms in the bridge. Examples of suitable bidentate ligands are: 1,3-bis(diphenylphosphino)propane, 1,3-bis(di-p-methoxyphenylphosphine)propane, 1,3-bis(diphenylphosphino)propane, and 2-methyl-2-(methyldiphenylphospino)-1,3-bis(diphenyl-phosphino) propane. Preferably either one of the latter two bidentate ligands is used.

The polymerization using the catalyst compositions according to the invention is preferably carried out in a liquid diluent. Very suitable liquid diluents are lower alcohols such as methanol and ethanol.

The quantity of catalyst composition applied in the preparation of the polymers may vary within wide ranges. Per mol of olefinically unsaturated compound to be polymerized, a quantity of catalyst is used which preferably contains $10^{-7}$—$10^{-3}$ and in particular $10^{-6}$—$10^4$ gram atom of palladium.

Preferably, the preparation of the polymers is carried out at a temperature of 20°–200° C. and in particular at a temperature of 30°–150° C. The carbon monoxide used in the preparation of the polymers according to the invention need not be pure. It may contain contaminations, such as hydrogen, carbon dioxide and nitrogen.

The higher the molecular weight of the polymers according to the invention, the higher will be in general the intrinsic viscosity they exhibit. For the determination of the intrinsic viscosity of a polymer according to the invention, four solutions are first of all prepared by dissolving the polymer in four different concentrations at 100° C. in m-cresol. For each of these solutions, the viscosity is measured in a viscometer at 100° C. relative to m-cresol and $T_p$ the outflow time of the polymer solution, the relative viscosity ($\eta_{rel}$) is obtained from $\eta_{rel} = T_o/T_p$. From $\eta_{rel}$ can be calculated the inherent viscosity ($\eta_{inh}$) according to the formula: $\eta_{inh} = \ln \eta_c$ rel where c represents the concentration of the polymer in grams per 100 ml solution. By plotting graphically the $\eta_{inh}$ found for each of the four polymer solutions against the corresponding concentration (c) and then by extrapolating to c=0, the intrinsic viscosity [$\eta$] in dl/g is found. Instead of "intrinsic viscosity", this patent application will henceforth use the term recommended by the International Union of Pure and Applied Chemistry, viz. "Limiting Viscosity Number" (LVN). The polymers according to the invention generally have an LVN of between 0.2 and 5.0 dl/g. Preferred polymers have an LVN of between 0.3 and 4.5 dl/g and in particular an LVN of between 0.4 and 4.0 dl/g.

The polymers according to the invention have good mechanical properties. They can be processed by means of the usual techniques into, among other things, films, sheets, plates, fibers and molded objects. The low molecular weight polymers in particular may be used as intermediates for the production of plastics, as components in blends with other polymers (such as waxes and greases), as plasticizers for other polymers and as pour point depressants for middle distillate petroleum fuel products. The higher molecular weight polymers have use and utility as premium thermoplastics for fibers, films, injection molding, compression molding or blowing applications. On account of their properties, the higher molecular weight polymers according to the invention are suitable for many applications, such as in the auto industry, for the manufacture of packaging material for foods and drinks, as constructional and building material, for the manufacture of cables and for a variety of applications in the domestic sphere. In order to modify their characteristics or to strengthen them, the polymers according to the invention can be employed in combination with many other sorts of materials.

The invention will now be illustrated with the aid of the following examples.

Example 1

A carbon monoxide/ethylene copolymer was prepared as follows. 200 ml of methanol was introduced into a mechanically stirred autoclave with a volume of 300 ml. After the contents of the autoclave had been brought to a temperature of 65° C., ethylene and CO were introduced in amounts equivalent to 18 bar and 36 bar, respectively. A catalyst solution was then introduced in the autoclave, comprising:
18 ml of methanol,
0.03 mmol of palladium acetate,
0.03 mmol of 2-methyl-2-(methyldiphenylphosphino)-1,3-bis(diphenyl-phosphino)propane, and
0.06 mmol of p-toluenesulphonic acid.

The pressure was maintained at 55 bar by introduction under pressure of a 1:1 carbon monoxide/ethylene mixture. After one hour the polymerization was terminated by releasing the pressure. The polymer was filtered off, washed with methanol and dried at 70° C. The product was 9.6 g of copolymer, so the polymerization rate was 3200 g of copolymer/g of palladium/hour. The copolymer has an LVN of 1.1 dl/g.

Example 2

A carbon monoxide/ethylene copolymer was prepared substantially in the same way as the copolymer of Example 1, except that in this case ethylene and CO were introduced into the autoclave both in amounts equivalent to 27 bar. The product was 10.5 g of copolymer, so the polymerization rate was 3500 g of copolymer/g of palladium/hour. The copolymer had an LVN of 1.3 dl/g.

Example 3

A carbon monoxide/ethylene copolymer was prepared substantially in the same way as the copolymer of Example 1, except for the following differences
(a) ethylene and CO were introduced into the autoclave in amounts equivalent to 5 bar and 10 bar, respectively,
(b) the quantity of catalyst was 10/3 of the quantity used in Example 1,
(c) the pressure was maintained at 16 bar by introduction of a 1:1 carbon monoxide/ethylene mixture, and
(d) the polymerization was terminated after 19 hours.

The product was 51 g of copolymer, so the polymerization rate was 270 g of copolymer/g of palladium/hour. The copolymer had an LVN of 0.3 dl/g.

Example 4

A carbon monoxide/ethylene copolymer was prepared substantially in the same way as the copolymer of Example 3, except that in this case ethylene and CO were introduced into the autoclave both in amounts equivalent to 7.5 bar. The product was 47 g of copolymer, so the polymerization rate was 250 g of copolymer/g of palladium/hour. The copolymer had an LVN of 0.4 dl/g.

Example 5

A carbon monoxide/ethylene copolymer was prepared substantially in the same way as the copolymer of Example 1, except for the following differences
(a) ethylene and CO were introduced into the autoclave in amounts equivalent to 50 bar and 100 bar, respectively,
(b) the quantity of catalyst was 5/3 of the quantity used in Example 1 and
(c) the pressure was maintained at 151 bar by introduction of a 1:1 carbon monoxide/ethylene mixture.

The product was 20 g of copolymer, so the polymerization rate was 4000 g of copolymer/g of palladium/hour. The copolymer had an LVN of 3.3 dl/g.

Example 6

A carbon monoxide/ethylene copolymer was prepared substantially in the same way as the copolymer of Example 5, except that in this case ethylene and CO were introduced into the autoclave both in amounts equivalent to 75 bar. The product was 22 g of copolymer, so the polymerization rate was 4400 g of copolymer/g of palladium/hour. The copolymer had an LVN of 5.1 dl/g.

Example 7

A carbon monoxide/ethylene copolymer was prepared substantially in the same way as the copolymer of Example 5, except for the following differences
(a) the reaction temperature was 80° C., and
(b) the polymerization was terminated after 0.5 hour.

The product was 25 g of copolymer, so the polymerization rate was 10,000 g of copolymer/g of palladium/hour. The copolymer had an LVN of 1.1 dl/g.

Example 8

A carbon monoxide/ethylene copolymer was prepared substantially in the same way as the copolymer of Example 7, except that in this case ethylene and CO were introduced into the autocalve both in amounts equivalent to 75 bar. The product was 25 g of copolymer, so the polymerization rate was 10,000 g of copolymer/g of palladium/hour. The copolymer has an LVN of 2.4 dl/g.

Example 9

A carbon monoxide/ethylene copolymer was prepared substantially in the same way as the copolymer of Example 1, except for the following differences
(a) the reaction temperature was 35° C.,
(b) the quantity of catalyst was 10/3 of the quantity used in Example 1, and
(c) the polymerization was terminated after 25 hours.

The product was 37 g of copolymer, so the polymerization rate was 150 g of copolymer/g of palladium/hour. The copolymer had an LVN of 5.3 dl/g.

Example 10

A carbon monoxide/ethylene copolymer was prepared substantially in the same way as the copolymer of Example 1, except for the following differences
(a) the reaction temperature was 40° C., and
(b) the polymerization was terminated after 20 hours.

The product was 18 g of copolymer, so the polymerization rate was 300 g of copolymer/g of palladium/hour. The copolymer had an LVN of 2.2 dl/g.

Example 11

A carbon monoxide/ethylene copolymer was prepared substantially in the same way as the copolymer of Example 1, except that in this case the reaction temperature was 85° C. The product was 15 g of copolymer, so the polymerization rate was 5000 g of copolymer/g of palladium/hour. The copolymer had an LVN of 0.5 dl/g.

Example 12

A carbon monoxide/ethylene copolymer was prepared substantially in the same way as the copolymer of Example 1, except that in this case the reaction temperature was 110° C. The product 18 g of copolymer, so the polymerization rate was 6000 g of copolymer/g of palladium/hour. The copolymer had an LVN of 0.2 dl/g.

Of the Examples 1–12 only Examples 6 and 8 are examples according to the invention. In these examples the copolymers were prepared at an overall pressure within the range of 100 to about 250 bar and an ethylene/carbon monoxide partial pressure ratio of between 0.75 and 3. Examples 1–5, 7 and 9–12 fall outside the scope of the invention; they have been included in this patent application for comparison.

With the aid of $^{13}$C-NMR analysis it was established that the copolymers prepared according to Examples 1–12 had a linear alternating structure and therefor consisted of units of the formula $—CO—(C_2H_4)—$. All the copolymers prepared according to Examples 1–12 had a melting point of 257° C.

Comparison of Examples 9, 10, 1, 11 and 12, which were all carried out at the same overall pressure and ethylene/carbon monoxide partial pressure ratio but at different reaction temperatures, shows that an increase in reaction temperature of from 35 to 100° C. leads to an increased polymerization rate of from 150 to 6000 g of copolymer/g of palladium/hour, whereas the LVN drops from 5.3 to 0.2 dl/g. It is also seen that according as the temperatures used are higher, the positive influence this has on the polymerization rate decreases while the negative influence on the LVN is maintained.

Comparison of Examples 3, 1 and 5, which were all carried out at the same temperature and ethylene/carbon monoxide partial pressure ratio but at different overall pressures, shows that an increase in the overall pressure of from 16 to 151 bar leads to an increased polymerization rate of from 270 to 4000 g of copolymer/g of palladium/hour while at the same time the LVN increases from 0.3 to 3.3 dl/g.

Comparison of Example 1 with Example 2 and of Example 3 with Example 4, which were prepared in pairs at the same temperatures and overall pressures but at different ethylene/carbon monoxide partial pressure ratios, shows that an increase in partial pressure ratio from 0.5 to 1 at an overall pressure below 75 bar produces no significant change in either polymerization rate or LVN.

Comparison of Example 5 with Example 6 and of Example 7 with Example 8, which were carried out in pairs at the same temperatures and overall pressures but at different ethylene/carbon monoxide partial pressure ratios, shows that an increase in partial pressure ratio from 0.5 to 1 at an overall pressure between 100 and 250 bar produces no significant change in the polymerization rate, whereas the LVN increases considerably.

Comparison of Example 6 with Example 9 and of Example 8 with Example 10, which produced pairs of copolymers having similar LVN's, shows that by the polymerization carried out according to the invention polymerization rates are achieved which are 29 and 33 times as high, respectively.

What is claimed is:

1. A process for preparing a linear alternating polymer which process comprises contacting ethylene and carbon monoxide in the presence of a catalyst, at a total pressure within the range of 100 to about 250 bar and an ethylene/carbon monoxide partial pressure ratio from about 0.75 to about 3, wherein the catalyst comprises (1) a compound of a Group VIII metal selected from the group consisting of palladium, cobalt, and nickel, (2) an anion of a non-hydrohalogenic acid with a pKa less than 6 and (3) a bidentate ligand of the general formula

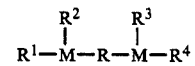

wherein M is selected from the group consisting of phosphorus, arsenic or antimony, R is a bivalent organic bridging group containing at least two carbon atoms in the bridge and $R^1$, $R^2$, $R^3$ and $R^4$ are substituted or unsubstituted hydrocarbon groups, and under conditions suitable to prepare a linear alternating polymer.

2. The process of claim 1 wherein the ethylene/carbon monoxide partial pressure ratio is about 0.80 to about 2.5.

3. The process of claim 1 wherein the ethylene/carbon monoxide partial pressure ratio is about 0.85 to about 2.

4. The process of claim 1 wherein contacting temperature is from about 20° to about 200° C.

5. The process of claim 1 wherein contacting temperature is from about 30° to about 150° C.

6. The process of claim 1 wherein the process is carried out by contacting the monomers with a catalyst in the presence of a liquid diluting agent.

7. The process of claim 1 wherein the Group VIII metal compound is a palladium compound.

8. The process of claim 1 wherein the Group VIII metal compound is a palladium salt of a carboxylic acid.

9. The process of claim 1 wherein the anion of a non-hydrohalogenic acid having a pKa less than 6 is an anion of an acid selected from the group consisting of sulfonic acids having a pKa less than 2 and carboxylic acids having a pKa less than 2.

10. The process of claim 1 wherein the anion of a non-hydrohalogenic acid having a pKa less than 6 is an acid selected from the group consisting of para-toluenesulfonic acid and trifluoroacetic acid.

11. The process of claim 1 wherein quantity of the anion of an acid having a pKa less than 6 is from about 0.5 to about 200 equivalents per gram atom of Group VIII metal.

12. The process of claim 1 wherein M is phosphorus.

13. The process of claim 1 wherein quantity of the bidentate ligand is from about 0.1 to about 5.0 mol per mol of Group VIII metal compound.

14. The process of claim 1 wherein quantity of the bidentate ligand is from about 0.5 to about 1.5 mol per mol of Group VIII metal compound.

15. The process of claim 1 wherein the divalent organic bridging group R contains three carbon atoms in the bridge.

16. The process of claim 1 wherein the hydrocarbon groups $R^1$, $R^2$, $R^3$, and $R^4$ each contain 6 to 14 carbon atoms.

17. The process of claim 1 wherein the bidentate ligand is selected from the group consisting of 1,3-bis(-diphenylphosphino)propane, and 2-methyl-2(methyldiphenylphosphino)-1,3-bis(diphenylphosphino)propane.

18. The process of claim 1 wherein quantity of the catalyst is from about $10^{-7}$ to about $10^{-3}$ gram atom of Group VIII metal per mol of ethylene.

19. A process for preparing a linear alternating polymer of carbon monoxide and ethylene, which process comprises contacting ethylene and carbon monoxide at a total pressure within the range of 100 to about 250 bar and an ethylene/carbon monoxide partial pressure ratio from about 0.85 to about 2, and in the presence of a catalyst obtained from (1) a palladium compound, (2) an anion of a non-hydrohalogenic acid having a pKa less than 2 and (3) a bidentate ligand of the general formula

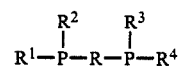

wherein R is a bivalent organic bridging group having a bridge containing three carbon atoms and $R^1$, $R^2$, $R^3$ and $R^4$ are unsubstituted or substituted hydrocarbon groups wherein the substituents are polar, and under conditions suitable to prepare a linear alternating polymer.

20. The process of claim 19 wherein the palladium compound is a salt of a carboxylic acid.

21. The process of claim 20 wherein the anion is provided in the form of an acid.

22. The process of claim 21 wherein the acid is selected from para-toluenesulfonic acid and trifluoroacetic acid.

23. The process of claim 22 wherein the bidentate ligand is selected from the group consisting of 1,3-bis(-diphenylphosphino)propane, 1,3-bis(di-p-methoxyphenylphosphino)propane and 2-methyl-2-(methyldiphenylphosphino)-1,3-bis(diphenylphosphino)propane.

24. The process of claim 21 wherein contacting temperature is from about 30° to about 150° C.

25. The process of claim 1, wherein the total pressure is about 125 to about 175 bar.

26. The process of claim 19, wherein the total pressure is about 125 to about 175 bar.

* * * * *